July 8, 1947. C. H. KOLLENBERG ET AL 2,423,780
PRECOATING FILTERS
Filed Nov. 4, 1944
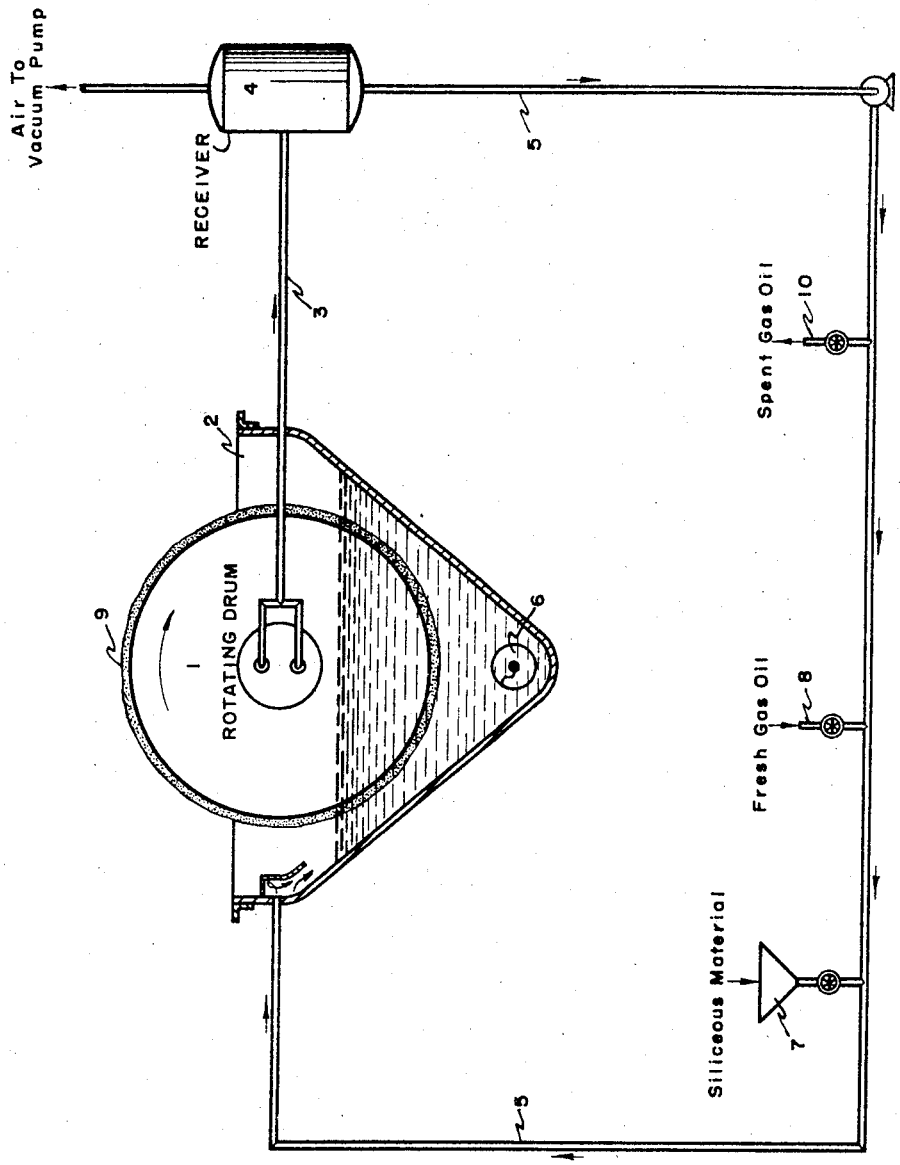
Conrad H. Kollenberg
Nick P. Peet INVENTORS.
BY P. J. Whelan
ATTORNEY.

Patented July 8, 1947

2,423,780

UNITED STATES PATENT OFFICE 2,423,780

PRECOATING FILTERS

Conrad H. Kollenberg, Goose Creek, and Nick P. Peet, Baytown, Tex., assignors to Standard Oil Development Company, a corporation of Delaware Application November 4, 1944, Serial No. 561,947

2 Claims. (Cl. 210—199)

The present invention is directed to the operation of precoating rotary filters.

Precoat filters are used to a large extent in industry and particularly in oil refineries. These filters have a rotating perforated cylinder carrying a coat of uniform thickness of a porous material, such as diatomaceous earth and the like. The material to be filtered is fed to the outside of the cylinder, the filtrate passing through the coat of porous material to the interior of the cylinder and the solid matter depositing on the surface of the coat. As the solid matter is deposited, it is shaved off together with a thin layer of the coat and the filtering operation continued until the coat is reduced to a thickness which is unsuitable for efficient filtration. As a result of these operations, the porous coat is ultimately removed and must be replaced. This is done by feeding a suspension of the coating material or other porous bodies in a liquid to the exterior of the cylinder as in a regular filtering operation, and continuing until the desired thickness of coat is obtained prior to resuming the filtering operation.

In refinery operations, the liquid used as the suspending medium for the particles of coating material is conventionally an oil, such as a gas oil, because other liquids might interfere with the filtering operation itself as by contaminating the filtrate or emulsifying therewith. The difficulty has been encountered that diatomaceous earth and similar porous materials in the form of fine particles do not remain in suspension in oil, such as gas oil, but quickly agglomerate and settle. This undesirable action is assumed to be caused by the presence of minute amounts of moisture in the oil or in the solid particles. As a consequence of this agglomeration, difficulty is encountered in depositing the particles on the rotating cylinder of the filter because they settle to the bottom of the tank below the cylinder before they are deposited.

According to the present invention, this difficulty is overcome by adding to the suspension of solid particles in the oil a small amount of an alkali metal hydroxide such as sodium hydroxide. This substance serves to keep the solid particles uniformly dispersed in the gas oil and makes possible the deposition of a uniform precoat on the filter surface. It is not clearly understood by what mechanism the alkali metal hydroxide performs its function. It apparently does not act in the same way in which it acts as a dispersing agent for clays in water because other substances which are far more effective than alkali metal hydroxide for the latter purpose, such as sodium silicate, sodium hexametaphosphate, sodium borate and the like, are not operative in the method of the present invention. The alkali metal hydroxide likewise apparently does not serve as an emulsifying agent because other substances, such as sodium sulfonate, which are far more effective emulsifying agents, do not function satisfactorily in the method of the present invention.

The present invention may be more clearly understood from the following detailed description of the accompanying drawing, in which the single figure is a flow plan of the operation of depositing a precoat on a rotating cylindrical filter. Referring to the drawing in detail, numeral 1 designates the rotating cylinder of a rotary filter mounted to rotate in a tank 2. The axis of the cylinder is provided with draw-off lines which feed into a discharge line 3 to an accumulating tank 4. The liquid from this tank, in this case gas oil, passes through line 5 back to the tank 2 where it is introduced in such a way as to form a layer on the bottom of the tank 2 in which the cylinder 1 is partly immersed. Usually a screw agitator 6 is provided in the bottom of the tank. The porous material, ordinarily a special siliceous material, is feed into the liquid vehicle in line 5 through an eductor 7. In the practice of the present invention, the alkali metal hydroxide in the form of concentrated aqueous solution is fed in with or after the solid particles through the eductor. If desired, however, it can be injected into line 5 through branch line 8. The amount of alkali metal hydroxide added may vary between 3 to 6 pounds of alkali metal hydroxide per 100 pounds of precoat material. These are not intended to be limiting quantities since they can be varied, but the range given yields satisfactory results.

Branch line 8 may also be employed for introducing make-up gas oil to the system since in some instances it may be desirable to withdraw a portion of the used gas oil by branch line 10.

Because suction is applied to the interior of the cylinder, the gas oil passes through the cylinder leaving a coating 9 of the precoat material on the surface of the cylinder. This coat can be applied to any desired thickness.

It will be understood that no effort is made to show in the drawing a complete rotary filter but only enough of the elements to illustrate the present invention. This filter is ordinarily provided with a feed line for the material to be filtered and a knife for scraping off the solid residue from the surface of the cylinder, together with means for carrying away the scraped off residue. Since these various elements are not involved in the practice of the present invention, they are omitted for the sake of clarity.

The nature and objects of the present invention having been fully described and illustrated, what we wish to claim as new and useful and to secure by Letters Patent is:

1. A method for applying a precoat of finely divided diatomaceous earth particles to a rotary filter including the steps of rotating the rotary filter in a bath of a hydrocarbon liquid carrying said particles in suspension, adding to said suspension a small amount of an alkali metal hydroxide, and applying suction to the interior of said rotary filter.

2. A method of applying a precoat of finely divided diatomaceous earth particles to a rotary filter including the steps of preparing a suspension of diatomaceous earth in hydrocarbon liquid with a small amount of alkali metal hydroxide therein to form a stable suspension, providing a bath of the stable suspension in contact with the exterior surface of at least a portion of a rotary filter and causing the pressure on the inner surface of that portion of the filter in contact with the bath to be less than the pressure on the exterior surface thereof.

CONRAD H. KOLLENBERG.
NICK P. PEET.

REFERENCES CITED

The following references are of record in the file of this patent:

UNITED STATES PATENTS

| Number | Name | Date |
| --- | --- | --- |
| 1,710,343 | Cannon | Apr. 23, 1929 |
| 2,296,850 | Harrison | Sept. 29, 1942 |
| 2,255,875 | Buxton et al. | Sept. 16, 1941 |
| 760,364 | Woolworth | May 17, 1904 |